United States Patent [19]
Yonezu et al.

[11] 3,763,469
[45] Oct. 2, 1973

[54] FLASHER FOR AUTOMOTIVE VEHICLES AND THE LIKE

[75] Inventors: Hisashi Yonezu, Chita-gun, Aichi-ken; Yoshihiko Kondo, Showa-ku, Nagoya-shi, Aichi-ken, both of Japan

[73] Assignee: Nippon Denso Kabushiki Kaisha, Aichi-ken, Japan

[22] Filed: Apr. 20, 1971

[21] Appl. No.: 135,803

Related U.S. Application Data

[63] Continuation of Ser. No. 716,419, March 27, 1968, abandoned.

[30] Foreign Application Priority Data

| Apr. 24, 1967 | Japan | 42/26131 |
| June 8, 1967 | Japan | 42/36602 |
| June 8, 1967 | Japan | 42/36603 |

[52] U.S. Cl. ......... 340/80, 317/148.5 R, 340/81 F, 340/251
[51] Int. Cl. ............................................. B60q 1/38
[58] Field of Search ...................... 340/81, 251, 331; 315/209, 210, 217

[56] References Cited
UNITED STATES PATENTS

| 3,002,127 | 9/1961 | Grontkowski | 340/331 X |
| 3,113,242 | 12/1963 | Leeder | 315/209 |
| 3,204,146 | 8/1965 | Kratochvil | 340/81 R |
| 3,263,123 | 7/1966 | Leeder | 340/81 R UX |
| 3,268,765 | 8/1966 | Randolph | 340/331 X |
| 3,281,611 | 10/1966 | Leeder | 340/81 R X |
| 3,487,358 | 12/1969 | Utukata et al. | 340/81 F |
| 3,569,780 | 3/1971 | Skinner | 340/81 F X |

Primary Examiner—John W. Caldwell
Assistant Examiner—Kenneth N. Leimer
Attorney—McGlew & Toren

[57] ABSTRACT

A flasher, for an automotive vehicle signalling system, has a flashing cycle determined by the charge-discharge time of an R-C circuit. The condenser of the R-C circuit controls the conductivity of a transistor having a relay operating coil connected in series in its collector-emitter circuit, this relay operating coil controlling transfer of normally closed contacts and normally open contacts which control connection of the lamps to the source of potential. Upon failure of a signal lamp, during turn signal operation, resulting in reduction of the load on the flasher, the condenser is bypassed and the transistor remains constantly conductive. A hazard signal switch is selectively operable to flash all of the signal lamps, and the hazard signal cycle continues even if one or more of the signal lamps become defective.

9 Claims, 3 Drawing Figures

Patented Oct. 2, 1973

INVENTORS
HISASHI YONEZU
YOSHIHIKO KONDO

BY MacGlew and Toren
attorneys

FLASHER FOR AUTOMOTIVE VEHICLES AND THE LIKE

CROSS-REFERENCE TO RELATED APPLICATION

This application is a continuation of application Ser. No. 716,419, filed Mar. 27, 1968, for "FLASHER FOR AUTOMOTIVE VEHICLES AND THE LIKE," and now abandoned.

BACKGROUND OF THE INVENTION

Turn signaling arrangements are substantially standard equipment on automotive vehicles, a projected turn of a vehicle being signaled by flashing the lamps on that side of the vehicle corresponding to the direction in which the vehicle intends to turn. Also, hazard warning systems are standard equipment on many automotive vehicles and, in addition, are required by law in certain jurisdictions. These hazard warning systems flash all of the turn signal lamps of a vehicle to indicate an emergency halt or stop of the vehicle. The signal lamps may be flashed either in unison or in alternation.

An automotive flasher for a turn signaling operation, having a means providing an indication of the failure of a signal lamp, and an automotive flasher for hazard warning signals, are independent units requiring considerably complicated circuit connections to the signal lamps. Combining both the turn signal circuit and the hazard signal circuit into one arrangement will reduce two flashing circuits to one and simplify the switching circuit construction. However, in general, a flasher used for turn signaling operation functions as a specific load-type of flasher so that, for example, when a left turn signal is to be indicated and one of the two lamps, one at the front and the other at the rear of the vehicle, is inoperative, the flasher either operates unduly fast or unduly slow, or is kept "steady on" or "steady off" to advise the driver of the failure of a lamp through the medium of an indicating or pilot lamp flashed in synchronism with the turn signal flasher.

On the other hand, a flasher used in a hazard warning signal system needs to function as a variable load-type of flasher even if one or nearly all of the signal lamps is inoperative and, even if only one signal lamp remains operative, this signal lamp should keep flashing. In case there is only one turn indicating lamp left operative, in a turn signal system, a specific load-type of flasher either stops operating or nearly stops operating, whereas a variable load-type flasher continues flashing at a steady rate. Since the two signaling operations, and the flashers required therefor, function in manners which are quite contrary to each other, it has been quite difficult to realize an automotive flasher or flasher arrangement combining both functions without interference of one function with another.

SUMMARY OF THE INVENTION

This invention relates to flashers, such as used in automotive vehicles and, more particularly, to an improved flasher designed for effective operation both when signaling a projected turn of the vehicle and when signaling an emergency stop or a halted condition of the vehicle.

In accordance with the invention, a novel flasher construction is provided which will perform both of the above-mentioned functions. The flasher includes an electric relay, controlled by one or more transistors, which is included in the circuit of the turn signal indicating lamps. The flasher is operable with both a turn signal switch and a hazard warning signal switch and thus, in effect, is a combined flasher for both types of operation.

With the flasher of the invention, a turn signaling operation may be effected only when the ignition switch is closed. However, insofar as the hazard warning signal operation is concerned, the invention flasher is operable independently of the position of the ignition switch.

As stated, the invention flasher includes a main relay having energization of an operating winding thereof controlled by a transistor, this relay including a pair of normally open contacts or switch means. Whenn the relay coil is energized, the normally open contacts are closed and are included in a series circuit connecting the signal lamps to the source of potential. The operation of the R-C circuit switches the transistor between "on" and "off" cyclically, and the relay correspondingly opens and closes its normally open contacts, during a predetermined cycle time, to flash the signal lamps.

With respect to the operation of the flasher both as a variable load-type of flasher and as a specific load-type flasher, the flasher operates as a specific load-type of flasher during turn signaling operation, and this is effected by connecting the sensing component of a current limiter in series in the load circuit during turn signaling operations. During hazard warning signal operations, the flasher operates as a variable load-type of flasher by virtue of the sensing part of the current limiting means being cut out of circuit.

An object of the invention is to provide a flasher, for automotive vehicles and the like, operable as a specific load-type of flasher during turn signaling operations and as a variable load-type of flasher during hazard warning signal operations.

Another object of the invention is to provide such a flasher in which the flashing cycle is controlled by an R-C circuit, responsive to the charging and discharging times of the condenser.

A further object of the invention is to provide such a flasher including a transistor controlled by the R-C circuit and controlling energization of the operating coil of a relay having contacts included in a series circuit between signal lamps and a source of potential.

Yet, another object of the invention is to provide such a flasher in which, during a turn signaling operation, a load current sensing means is connected in circuit to detect a decrease in the load on the flasher to provide an indication when one or more signal lamps are defective.

A further object of the invention is to provide such a flasher in which the load current sensing means is cut out of circuit during hazard warning signal operation of the flasher.

Still another object of the invention is to provide such a flasher in which the load current sensing means is a second relay.

A further object of the invention is to provide such a flasher in which the load current sensing means is a second transistor.

An ancillary object of the invention is to provide such a flasher which, for turn signaling operation, must be connected to a source of potential through the vehicle ignition switch and, for hazard warning signal operation, is connected to the source of potential independently of the vehicle ignition switch.

BRIEF DESCRIPTION OF THE DRAWINGS

For an understanding of the principles of the invention, reference is made to the following description of typical embodiments thereof as illustrated in the accompanying drawings.

In the Drawings.

DESCRIPTION OF THE PREFERRED EMBODIMENTS

Figure 1:
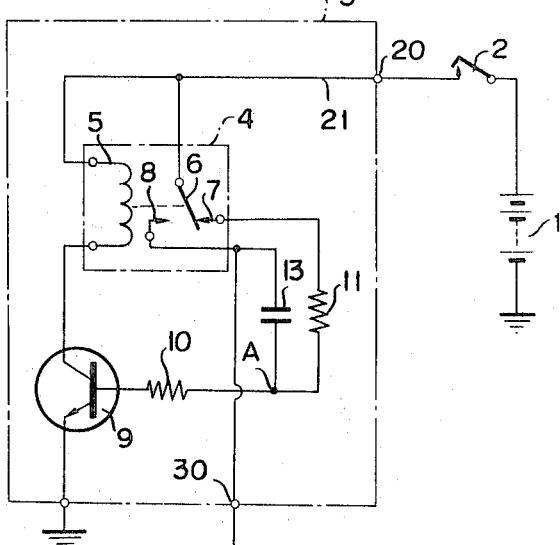
FIG. 1 is a schematic wiring diagram illustrating the basic principle of operation of the invention flasher.

Referring first to FIG. 1, a suitable source of potential, such as a 12 volt battery 1, is illustrated as having a first terminal connectable, through an ignition switch 2, to an input terminal 20 of a flasher generally designated at 3. Flasher 3 includes a main relay 4 having an exciting coil or winding 5, a movable armature 6, a normally closed fixed contact 7 and a normally open fixed contact 8. Exciting coil 5 of relay 4 is connected, in series with the collector-emitter circuit of an NPN transistor 9, between a grounded output terminal of the flasher and the input terminal 20. The second terminal of battery 1 is also grounded in the usual manner.

A resistor 10 is connected between the base of transistor 9 and a junction point $A$, and a resistor 11 has one end connected to junction point $A$ and its opposite end connected to fixed contact 7 of relay 4, the armature or movable contact 6 of relay 4 being connected by a conductor 21 to input terminal 20 of the flasher. A condenser 13 has one terminal connected to junction point $A$ and its other terminal connected to normally open fixed contact 8 of relay 4. A signal lamp 38, having one grounded terminal, has its other terminal connected to an output terminal 30 of flasher 3, and terminal 30 is connected to the junction point between fixed contact 8 and condenser 13. When ignition switch 2 is closed, current flows from battery 1 through switch 2, input terminal 20, conductor 21, contacts 6 and 7, constituting a normally closed switch means, resistor 11, condenser 13, output terminal 30 and lamp 38 to ground. However, the current flow is not sufficiently large to effectively light lamp 38, as the ohmic value of registor 11 is selected to be large, as will be described. Thus, the fixed resistance of lamp 38 is far less than that of resistor 11, so that the voltage across condenser 13 will increase from zero and, accordingly, the potential at junction point A will increase correspondingly. When the potential at junction A exceeds the value necessary to trigger transistor 9 conductive, current flows from conductor 21 through exciter coil 5 of relay 4 and through the collector-emitter circuit of transistor 9 to ground. Energization of exciting coil 5 transfers movable contact 6 to disengage fixed contact 7 and engage fixed contact 8, contacts 6 and 8 constituting a normally open switch means. Thereby, the full voltage of battery 1 is applied to lamp 38 which is thus lit.

At the same time, current flows through contact 8, condenser 13, and resistor 10 to the base of transistor 9 and holds transistor 9 conductive. Lamp 13 is kept fully energized until transitor 9 becomes non-conductive after condenser 13 has been fully charged so that no current flows to the base of transistor 9. At this time, exciting winding 5 is deenergized and movable contact 6 disengages fixed contact 8 and re-engages fixed contact 7, thus effectively deenergizing lamp 38. The time $t_1$ during which lamp 38 is lit depends approximately on the time constant determined by the resistance of resistor 10 and the capacity of condenser 13, which constitute an R-C circuit.

During movement of contact 6 from contact 7 to contact 8, the base current for transistor 9, drawn through contact 8, is momentarily interrupted. However, the partially charged condenser 13 feeds current to the base of transistor 9 during this transfer period. Thus, without the use of a "make before break contact" for relay 4, the supply of base current to transistor 9 is not interrupted so that no "buzzer effect" occurs.

The operation of the circuit after condenser 13 has been fully charged and transistor 9 has been rendered non-conductive will now be described. The potential at the junction point of condenser 13 and contact 8 is approximately equal to the battery voltage, or is approximately 12 volts. When movable contact 6 re-engages fixed contact 7 to re-close the normally closed switch means, the potential at the junction point of condenser 13 and contact 8 becomes approximately zero, as the fixed resistance of lamp 38 is negligibly small. As a result, the potential at junction point $A$ is biased negative, to approximately $-12$ volts, with respect to ground. Thus, condenser 13 begins to discharge its stored energy in the circuit including lamp 38, battery 1, switch 2, normally closed switch means 6 and 7 and resistor 11. The period $t_2$ during which the potential at junction point $A$ varies from $-12$ volts to zero depends solely on the time constant determined by the R-C circuit including resistor 11 and the capacity of condenser 13. Thus, one complete cycle is completed and the potential at junction point $A$ begins to rise again in the positive direction.

The flashing period $T$ is given as follows:

$$T = t_1 + t_2 + t_3$$

;where $t_3$ is equal to the time for the potential at junction point $A$ to rise from zero to a voltage sufficient to light lamp 38. Accordingly, there is easily derived the relation that the on time of lamp 38 is equal to $t_1$, and that the off time of lamp 38 is equal to $t_2 + t_3$. The circuit thus functions as a flasher means of the variable load-type.

Figure 2:
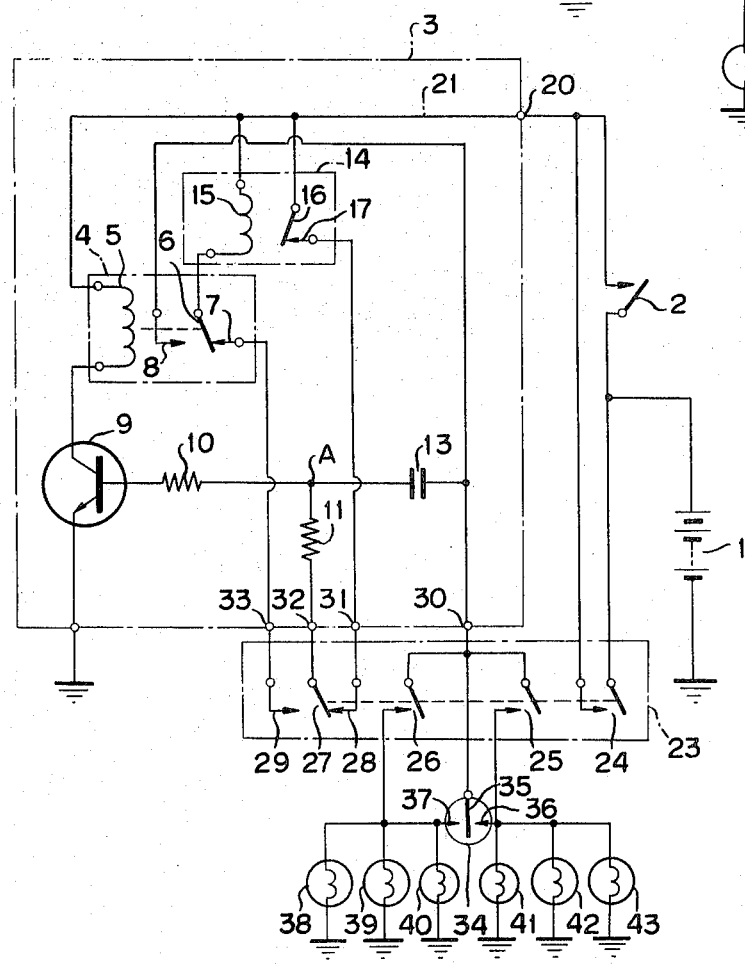
FIG. 2 is a schematic wiring diagram of a combined turn signaling and hazard warning system including one form of flasher embodying the invention.

Referring to FIG. 2, the basic flasher shown in FIG. 1 is augmented by additional circuitry and additional components. A current relay 14 is indicated as including an exciting coil or winding 15, constituting a current sensing means, and a movable contact 16 and a normally closed fixed contact 17, constituting switch means. Exciting coil 15, whose d.c. resistance is made sufficiently small that the voltage drop across coil 15, due to the current flow through a lamp, is negligible, is connected between conductor 21 and movable contact 6 of main relay 4. Movable contact 16 of relay 14 is connected to conductor 21, while fixed contact 17 of relay 14 is connected to junction point $A$ through a flasher output terminal 31, a normally closed contact 28 of a hazard warning switch 23, a movable contact 27 of the hazard warning switch, a second output terminal 32 and resistor 11.

Fixed contact 7 of main relay 4, constituting part of the normally closed switch means, is connected to a normally open contact 29 of hazard warning switch 23. When hazard warning switch 23 is operated, movable contact 27 disengages contact 28 and engages contact 29, thereby connecting normally closed fixed contact 7 to junction point $A$ through terminal 32 and resistor 11.

Hazard warning switch 23 further includes normally open switches 24, 25 and 26, the movable contacts of which are so coupled that they are operated simultaneously with movable contact 27. One contact of switch 24 is connected to battery 1, and the other contact to input terminal 20 of flasher 3. One contact of switch 25 is connected to flasher output terminal 30 while the other contact thereof is connected to the junction point of right turn indicating lamps 42, 43, pilot or indicating lamp 41 for the right turn indication and a right turn fixed contact 36 of a turn signal switch 34.

One contact of switch 26 is connected to flasher output terminal 30 while the other contact thereof is connected to the junction point of left turn indicating lamps 38, 39, a pilot or indicator lamp 40 for left turn indication and a left turn fixed contact 37 of turn signal switch 34. The movable contact 35 of turn signal switch 34 is connected to flasher output terminal 30. This movable contact is normally in a neutral position, in a known manner, and may be engaged with either right turn contact 36 or left turn contact 37 by manual operation by the vehicle driver. It will be noted that the other terminals of lamps 38 through 43 are grounded, also in the usual manner.

The operation of the signaling arrangement of FIG. 2 will now be described on the assumption that both turn signal switch 34 and hazard warning switch 23 are in the position illustrated in FIG. 2. Under these conditions, when ignition switch 2 is closed, current flows from battery 1 to the base of transistor 9 through switch 2, flasher input terminal 20, conductor 21, movable contact 16 and fixed contact 17 of relay 14, flasher terminal 31, fixed contact 28 and movable contact 27 of hazard warning switch 23, flasher terminal 32, and resistors 11 and 10, and triggers transistor 9 conductive. Exciting coil 5 of main relay 4 is now energized through the conducting transistor 9 and transfers movable contact 6 of relay 4 from fixed contact 7 to fixed contact 8, constituting part of the normally open switch means. Battery voltage thus appears at output terminal 30 through exciting coil 15 of relay 14, movable contact 6 of relay 4 and fixec contact 8 of relay 4. However, current does not flow through the above-mentioned circuit because the load circuit connected to terminal 30 is open. Thus, movable contact 16 of current relay 14 remains in contact with normally closed fixed contact 17 of relay 14, but the preparation for turn signaling is complete.

Thus, when turn signal switch 34 is operated to indicate, for example, a left turn, lamps 38, 39 and 40 are connected to output terminal 30 of flasher 3 so that these lamps can be flashed in the same manner as described with reference to FIG. 1. Current relay 14 is so designed that movable contact 16 is disengaged from fixed contact 17 when the exciting current flowing through coil 15 is above a predetermined value, the current flow required to energize coil 15 to transfer contact 16 of relay 14 being greater than the amount of current drawn by one lamp 38 or 39, but less than that drawn by both lamps.

In case one of the signal lamps 38 and 39 burns out or is defective, the current flowing through coil 15 is not sufficient to transfer contact 16 from contact 17. The base current for transistor 9 is then supplied continuously through contacts 16 and 17, contacts 28 and 27, and resistors 11 and 10 interconnected at junction point $A$. The still operable signal lamp remains lit, as well as pilot lamp 40, these two lamps being steadily lit so that the steady indication of pilot lamp 40 alerts the driver to the fact that one signal lamp is defective or burnt out. In other words, exciting coil 15 of current relay 14 serves as a detector of a current limiter circuit in the "specific load-type" flashing function. A right turn may be signaled in the same manner as described for a left turn, with the burning out or other defect of a signal lamp 42 or 43 being indicated by steady illumination of pilot lamp 41.

The operation of the hazard warning switching device 23 will now be described. Normally open switch 24 of switching device 23 is connected in parallel with ignition switch 2, normally open switch 25 is connected in parallel with contacts 35 and 36 of turn signal switch 34, and normally open switch 26 is connected in parallel with contacts 35 and 37 of turn signal switch 34. Hazard warning switching device 23 is intended to operate irrespective of the position of ignition switch 2 and turn signal switch 34.

When hazard warning device 23 is operated, switches 24, 25 and 26 are closed and movable contact 27 disengages fixed contact 28 and engages fixed contact 29. All of the lamps 38 – 43 are now energized intermittently, or flashed, from battery 1, and flash a hazard warning irrespective of the positions of ignition switch 2 and turn signal switch 34. It will be noted that the hazard warning signaling circuit, due to the disengagement of contact 27 from contact 28, does not include the contacts 16 and 17 of current relay 14, so that whether contacts 16 and 17 are open or closed is immaterial. Thus, current limiter coil or winding 15 has no effect during the hazard warning signal operation, so that the hazard warning signal is maintained in a flashing state irrespective of whether one or more of the lamps 38 – 43 are defective or burnt out. The hazard warning circuit thus functions as a variable load-type of flashing circuit and independently of the value of the current flowing through the signal lamps.

Figure 3:
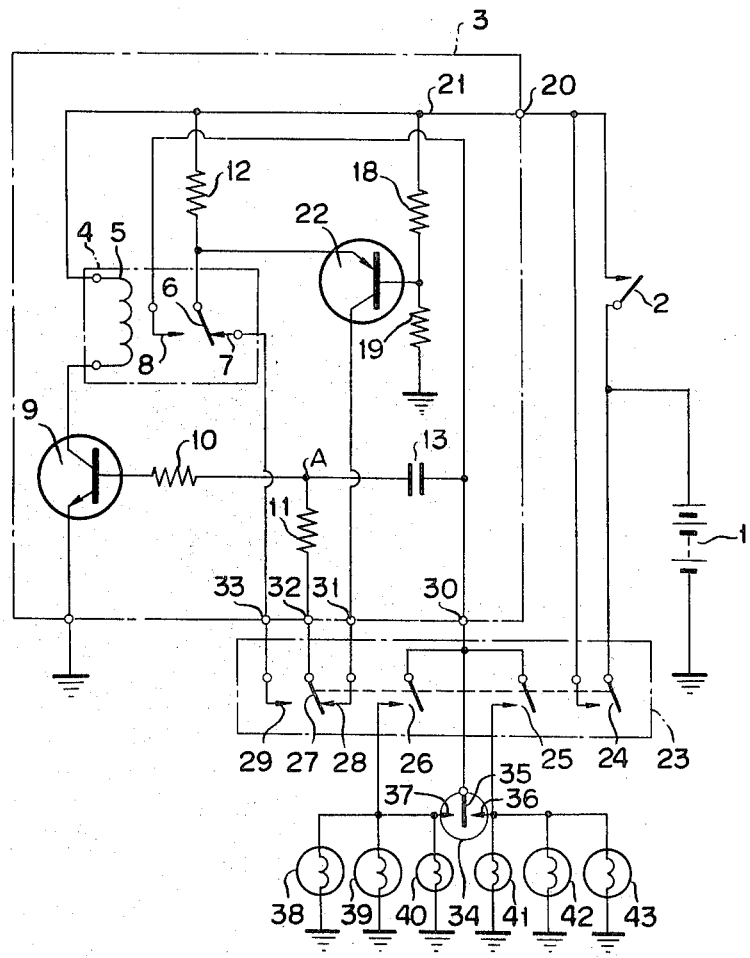
FIG. 3 is a view similar to FIG. 2, but illustrating a different form of flasher embodying the invention.

The embodiment of the invention shown in FIG. 3 differs from that shown in FIG. 2 in that a PNP-type transistor and associated resistors are substituted for the current relay 14 of the embodiment of FIG. 2. Referring to FIG. 3, the base of transistor 22 is connected to the junction point of resistors 18 and 19 which are connected as a voltage divider between flasher input terminal 20 and ground. The emitter of transistor 22 is connected to the junction point of a resistor 12 and the movable contact 6 of main relay 4, and the other terminal of load current detecting resistor 12 is connected to conductor 21. The collector of transistor 22 is connected to flasher terminal 31.

When ignition switch 2 is closed and turn signal switch 34 is operated, transistor 9 is triggered conductive so that main relay 4 is operated as described with respect to FIG. 2, to open its normally closed switch means 6, 7 and close its normally open switch means 6,8 by engaging its movable contact 6 with its fixed contact 8. Resistor 12, a group of the signal lamps 38 – 43, and resistors 18 and 19 conjointly define a bridge circuit one diagonal of which consists of the emitter-base circuit of transistor 22. A change in voltage across resistor 12, due to variations in the load current drawn by the group of signal lamps, controls the potential difference between the base and emitter of transistor 22 and thus controls conduction of transistor 22.

The ohmic value of each of resistors 12, 18 and 19 is so selected that the emitter potential of transistor 22 will be sufficiently positive with respect to the base potential thereof in case the lamp current, and thus the voltage drop across resistor 12, is smaller due to, for example, burn out of one of the lamps of the group of signal lamps. Also, the emitter potential will either be close to the base potential or slightly below the base potential in case the lamp current drawn, and thus the voltage drop across resistor 12,is greater due to all the signal lamps of the group being effectively energized.

Thus, if one lamp 38 of the left turn signal lamps is burnt out, during a left turn indication, transistor 22 is maintained conductive so that the remaining left turn signal lamp 39 and left turn indicating or pilot lamp 40 will continue to be lit in a steady fashion as described in connection with FIG. 2. On the contrary, if both lamps 38 and 39 are effectively energized, transistor 22 is triggered non-conductive so that signal lamps 38 and 39 and pilot lamp 40 continue to flash.

For a hazard warning signal, the circuit of FIG. 3 operates in the same manner as described for the hazard warning operation of FIG. 2. Thus, when hazard warning switch 23 is operated, movable contact 27 disengages fixed contact 28 so that transistor 22 is effectively cut out of the hazard warning signaling circuit.

While specific embodiments of the invention have been shown and described in detail to illustrate the application of the principles of the invention, it will be understood that the invention may be embodied otherwise without departing from such principles.

We claim:

1. An automotive vehicle signalling system comprising, in combination, a grounded lamp load; a grounded source of potential; and a flasher including a flasher input terminal connected to the ungrounded terminal of said source of potential, a flasher output terminal connected to said lamp load, a transistor having a base, an emitter and a collector, a condenser having one terminal connected to said flasher output terminal and another terminal connected, at a junction point, to the base of said transistor through a first resistor, normally closed switch means connecting said junction point, through a second resistor, to said flasher input terminal, normally open switch means operable, when closed, to connect said input terminal to said output terminal, and transfer means operable, when energized, to open said normally closed switch means and close said normally open switch means, said transfer means including a relay exciting coil connected, in series with the collector-emitter circuit of said transistor, between said flasher input terminal and ground.

2. A signalling system, as claimed in claim 1, in which said normally closed switch means comprises a first fixed contact connected to said second resistor and a movable contact connected to said input terminal and normally engaged with said first fixed contact; and a relay including said relay exciting coil, said first fixed contact and said movable contact; said normally open switch means comprising a second fixed contact of said relay connected to said output terminal and engaged by said movable contact upon energization of said relay exciting coil.

3. A signalling system, as claimed in claim 1, including current sensing means connected in series between said normally open switch means and said input terminal; a selectively operable switch connected between said output terminal and said lamp load to selectively connect said lamp load to said output terminal, said normally closed switch means being controlled by said current sensing means and connected in a series circuit connecting said input terminal to the junction of said condenser and said first resistor through said second resistor; said current sensing means being operable, when the current flow therethrough is reduced below a predetermined value, due to a part of said lamp load being defective, to close said normally closed switch means to connect said flasher input terminal through said series circuit to said junction point to maintain said transistor continuously conductive and the effective lamp load constantly energized.

4. A signalling system, as claimed in claim 3, in which said current sensing means comprises the exciting coil of a current sensing relay including said normally closed switch means; said normally closed switch means comprising a movable contact connected to said input terminal and a fixed contact connected to a second selectively operable switch and normally engaged by said movable contact, said movable contact disengaging said fixed contact when said exciting coil is sufficiently energized by an effective lamp load; said second selectively operable switch comprising a movable contact connected to said second resistor, a first fixed contact connected to the fixed contact of said normally closed switch means, and a second fixed contact connected to a normally closed section of said normally open switch means.

5. A signalling system, as claimed in claim 3, in which said current sensing means comprises a third resistor connected between said normally open switch means and said flasher input terminal; a second selectively operable switch including a first fixed contact, a movable contact connected to said second resistor, and a second fixed contact connected to a normally closed section of said normally open switch means; said normally closed switch means including a second transistor having one end of its emitter-collector circuit connected to the junction point of said third resistor and said normally open switch means and the other end thereof connected to said first fixed contact, and a voltage divider connecting the base of said second transistor to said flasher input terminal; the ohmic values of said third resistor and said voltage divider being such that, when the current flow through said third resistor is reduced below a predetermined value, due to a part of said lamp load being defective, to correspondingly reduce the voltage drop across said third resistor, said second transistor is triggered conductive to close said series circuit to maintain said first-mentioned transistor constantly conductive to maintain the effective lamp load constantly energized.

6. A signalling system, as claimed in claim 3, in which said selectively operable switch is a turn signal switch connected between said output terminal and said lamp load, said lamp load including at least a pair of signal lamps on one side of the vehicle and at least a pair of signal lamps on the opposite side of the vehicle; said selectively operable turn signal switch having a movable contact connected to the output terminal of said flasher and a pair of fixed contacts selectively engageable by said last-named movable contact; one of said turn signal switch fixed contacts being connected to the signal lamps on one side of the vehicle and the other of said turn signal switch fixed contacts being connected to the signal lamps on the opposite side of the vehicle.

7. A signalling system, as claimed in claim 6, including a second selectively operable switch having a pair of movable contacts each connected to said output terminal and a pair of fixed contacts each connected to the lamps on a respective side of the vehicle, said second selectively operable switch being connected in parallel with said turn signal switch between said output terminal and said signal lamps; said second selectively operable switch including a first fixed contact connected to said normally closed switch means, a movable contact connected to said second resistor, and a second fixed contact connected to a normally closed section of said normally open switch means; said second selectively operable switch movable contacts being coupled to engage the last movable contact with the second fixed contact when said pair of movable contacts engage their respective fixed contacts.

8. A signalling system, as claimed in claim 7, including a third selectively operable switch having a movable contact and a fixed contact and connected between said ungrounded terminal of said source of potential and said flasher input terminal; said third selectively operable switch operating conjointly with said second selectively operable switch and being closed when said second selectively operable switch has its last movable contact engaged with said second fixed contact, for functioning of the flasher as a variable load type of flasher.

9. A signalling system, as claimed in claim 6, including a pair of indicator lamps, each connected in parallel with the group of signal lamps on a respective side of the vehicle; each indicator lamp, when said turn signal switch is in the respective actuated position and at least one signal lamp of the respective group associated therewith is defective, being steadily illuminated during turn signal operation to serve as an indication of a defective signal lamp.

* * * * *